(12) United States Patent
Kinoshita et al.

(10) Patent No.: US 7,344,780 B2
(45) Date of Patent: Mar. 18, 2008

(54) FLUORORUBBER COATING COMPOSITION

(75) Inventors: Toshiyuki Kinoshita, Settsu (JP); Koichiro Ogita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/275,815

(22) PCT Filed: May 11, 2001

(86) PCT No.: PCT/JP01/03923

§ 371 (c)(1),
(2), (4) Date: Nov. 12, 2002

(87) PCT Pub. No.: WO01/85858

PCT Pub. Date: Nov. 15, 2001

(65) Prior Publication Data

US 2003/0157336 A1 Aug. 21, 2003

(30) Foreign Application Priority Data

May 11, 2000 (JP) .............................. 2000-138408

(51) Int. Cl.
B32B 15/08 (2006.01)

(52) U.S. Cl. ...................... 428/421; 428/422; 428/457; 428/461

(58) Field of Classification Search ................ 428/461, 428/421, 422; 526/242, 247, 250
See application file for complete search history.

(56) References Cited

U.S. PATENT DOCUMENTS

| 5,604,283 | A | 2/1997 | Wada et al. |
| 6,252,006 | B1 | 6/2001 | Tomihashi et al. |
| 6,325,752 | B1 | 12/2001 | Tomihashi et al. |
| 6,329,469 | B1 * | 12/2001 | Bowers et al. ............. 525/264 |
| 6,664,336 | B1 * | 12/2003 | Tomihashi et al. .......... 525/199 |
| 6,720,381 | B1 | 4/2004 | Tomihashi et al. |

FOREIGN PATENT DOCUMENTS

| EP | 0 574 319 A1 | 12/1993 |
| EP | 0 690 096 A1 | 3/1994 |
| EP | 0 894 837 A1 | 2/1999 |
| JP | 57-200474 | 12/1982 |
| JP | 2-248453 | 10/1990 |
| JP | 6-207068 | 7/1994 |
| JP | 7-34025 A | 2/1995 |
| JP | 7-286081 A | 10/1995 |
| JP | 9-157579 | 6/1997 |
| JP | 10-324840 | 12/1998 |
| JP | 11-310748 A | 11/1999 |
| WO | WO 97/39071 | 10/1997 |
| WO | WO 98/07784 | 2/1998 |
| WO | WO 99/07798 | 2/1999 |
| WO | WO 00/56825 | 9/2000 |
| WO | WO 01/25330 A1 | 4/2001 |

OTHER PUBLICATIONS

English language translation of International Preliminary Examination Report for PCT/JP01/03923 dated Aug. 7, 2001.
International Search Report for PCT/JP01/03923 dated Aug. 21, 2001.

* cited by examiner

Primary Examiner—Monique R. Jackson
(74) Attorney, Agent, or Firm—Sughrue Mion, PLLC

(57) ABSTRACT

An amino group-containing metal compound such as a coupling agent having an amino group is dispersed in a fluoroelastomer coating composition comprising a fluoroelastomer and a polyol curing agent which are dissolved or dispersed in a liquid medium. The resulting fluoroelastomer coating composition can form an elastomer coating layer directly on a metal surface using no primer, and improve antifreeze resistance and deterioration of the coating film after compression at high temperatures for a long time.

6 Claims, No Drawings

FLUORORUBBER COATING COMPOSITION

FIELD OF THE INVENTION

The present invention relates to a fluoroelastomer coating composition. In particular, the present invention relates to a fluoroelastomer coating composition comprising a fluorine-containing copolymer, a polyol curing agent, an amino group-containing metal compound and a liquid medium.

BACKGROUND ART

Fluoroelastomers (or fluororubbers) are coated on or impregnated in various substrates such as fabrics, fibers, metals, plastics, rubbers, etc. and widely used as industrial materials by making use of their good heat resistance, oil resistance, solvent resistance and chemical resistance. In particular, in the field of engine gaskets, recently fluoroelastomer-coated metal gaskets have been used as substitutes for asbestos gaskets, and it is expected that the fluoroelastomer-coated metal gaskets will be increasingly used.

Coating materials for metal gaskets should not be eroded with gas fluids under high temperature and high pressure conditions, have sufficient elasticity and flexibility at various temperatures and pressures, and maintain clamping forces necessary for preventing the leakage of the fluids from mated surfaces. In addition, such materials should have satisfactory resistances to antifreezes and engine oils.

As fluoroelastomer coating compositions for coating metal gaskets, polyol-curing coating compositions providing good sealing properties are usually used. In such a case, a primer should be applied to a substrate for adhering the coating composition to the substrate, and thus two steps should be carried out to form the primer layer and to form the fluoroelastomer layer.

On observing the degradation of a coating film under compression, the cured rubber of a polyol-curing fluoroelastomer composition more easily flows than that of a polyamine-curing fluoroelastomer composition when it is compressed at high temperatures for a long time, since no double bond contributes to the crosslinking in the former cured rubber.

When a polyamine-curing coating composition in which a primer component can be internally added to a curing agent is used, a coating process can be simplified, but a compression set, which is the most important property of a sealing material, is larger than a polyol-curing coating composition, and thus the clamping force should be increased to prevent the leakage from the mated surfaces.

DISCLOSURE OF THE INVENTION

One object of the present invention is to provide a fluoroelastomer coating composition which can form a coating layer of a fluoroelastomer directly on a metal surface without using any primer, and improve the resistance to antifreezes and the degradation of a coating film when it is compressed at a high temperature for a long time.

According to the present invention, the above object is achieved by fluoroelastomer coating composition comprising a liquid medium, and a fluoroelastomer, a polyol curing agent and an amino group-containing metal compound which are dissolved or dispersed in the liquid medium.

BEST EMBODIMENTS TO CARRY OUT THE INVENTION

Now, the components contained in the composition of the present invention will be explained.

Fluoroelastomers

The fluoroelastomer is preferably a fluorine-containing copolymer containing repeating units represented by —$CH_2$— in the backbones.

One typical example of such a copolymer is a fluorine-containing elastic copolymer comprising vinylidene fluoride. Examples of such a copolymer are copolymers comprising the following repeating units:

at least one repeating unit selected from the group consisting of —$CF_2$—$CH_2$—, —$CH_2$—$CH_2$— and —$CH_2$—$CH(CH_3)$—, and at least one repeating unit selected from the group consisting of —$CF_2$—$CF(CF_3)$—, —$CF_2$—$CF_2$—, —$CF_2$—CFCl—, —$CF_2$—$CF(CF_2H)$— and —$CF_2$—CF(ORf)- in which Rf is a fluoroalkyl group having 1 to 9 carbon atoms.

Specific examples of such copolymers include vinylidene fluoride-hexafluoropropylene copolymers, vinylidene fluoride-tetrafluoroethylene-hexafluoropropylene copolymers, ethylene-hexafluoropropylene copolymers, tetrafluoroethylene-propylene copolymers, etc.

Such fluorine-containing elastomeric copolymers are commercially distributed under the trade name of "DAIEL®" (available from Daikin Industries, Ltd.), "VITONE FLOME®" (available from E. I. duPont), "AFLAS®" (available from ASAHI GLASS Co., Ltd.), etc.

The molecular weight of the fluoroelastomer is preferably from 5,000 to 200,000.

Among them, the vinylidene fluoride copolymers are preferable from the viewpoint of their crosslinkability.

Polyol Curing Agents

The curing agent contained in the fluoroelastomer composition may be any curing agent that is commonly used as a curing agent of polyol-curing fluoroelastomers. Preferred polyol curing agents are explained below.

Herein, the polyol curing agent means a compound or a polymeric compound having at least two hydroxyl groups, in particular, phenolic hydroxyl groups in the molecule, and the curing ability.

Examples of the polyol curing agent includes phenol compounds of the formulas:

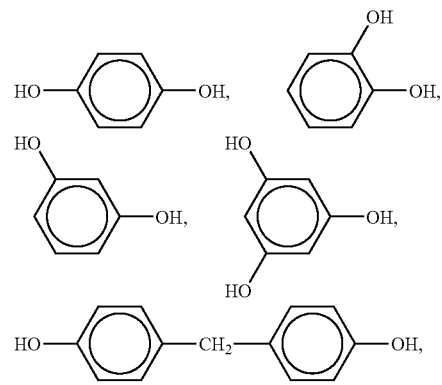

-continued

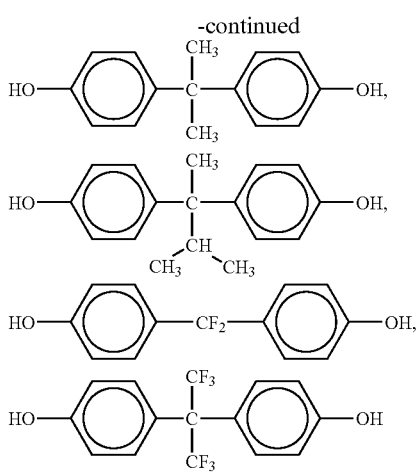

a phenolic resin of the formula:

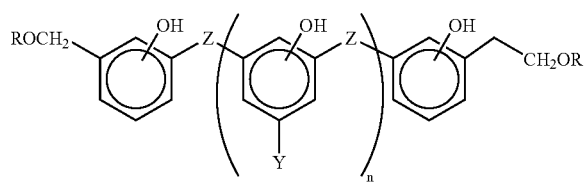

wherein Z is —CH$_2$— or —CH$_2$OCH$_2$—, Y is a hydrogen atom, a halogen atom, or a group of the formula: —R, —CH$_2$OR or —OR in which R is an alkyl group having 1 to 4 carbon atoms, and n is an integer of 0 to 100, and/or their salts with base compounds.

Preferred examples of the basic compound include the following ammonium salts or tertiary amines:

Ammonium Salts

Trimethylbenzylammonium, triethylbenzylammonium, dimethyldecylbenzylammonium, triethylbenzylammonium, myristylbenzyldimethylammonium, dodecyltrimethylammonium, dimethyltetradecylbenzylammonium, trimethyltetradecylammonium, coconuttrimethylammonium, stearyltrimethylammonium, distearyldimethylammonium, tetrabutylammonium, 1,4-phenylenedimethylenebistrimethylammonium, 1,4-phenylenedimethylenebistriethylammonium, ethylenebistriethylammonium, etc.

Tertiary Amines 1,8-Diaza-bicyclo[5.4.0]-undecene-7, 8-methyl-1,8-diaza-bicyclo[5.4.0]-undecene-7, 8-propyl-1,8-diaza-bicyclo[5.4.0]-undecene-7, 8-dodecyl-1,8-diaza-bicyclo[5.4.0]-undecene-7, 8-eicosyl-1,8-diaza-bicyclo[5.4.0]-undecene-7, 8-tetracosyl-1,8-diaza-bicyclo[5.4.0]-undecene-7, 8-benzyl-1,8-diaza-bicyclo[5.4.0]-undecene-7, 8-phenetyl-1,8-diaza-bicyclo[5.4.0]-undecene-7, 8-(3-phenylpropyl)-1,8-diaza-bicyclo[5.4.0]-undecene-7, trimethylamine, triethylamine, tri-n-propylamine, tri-n-butylamine, triisobutylamine, methyldiethylamine, dimethylethylamine, dimethyl-n-propylamine, dimethyl-n-butylamine, dimethylisobutylamine, dimethylisopropylamine, dimethyl-sec.-butylamine, dimethyl-tert.-butylamine, triallylamine, diallylmethylamine, allyldimethylamine, benzyldimethylamine, benzyldiethylamine, N-allylpiperidine, N-ethylpiperidine, N-butylpiperizine, N-methylpyrrolidine, N-cyclohexylpyrrolidine, N-n-butylpyrrolidine, N-ethylpyrrolidine, N-benzylpyrrolidine, 2,4,6-trimethylpyridine and the like.

Among them, phenol derivatives such as bisphenol A, bisphenol AF, hydroqunone, etc. and/or their salts; polyhydroxy compounds having enol type hydroxyl groups such as phenolic resins and/or their salts; a compound of the formula Rf(CH$_2$OH)$_2$ wherein Rf is a perfluoroalkylpolyether group are preferable.

Apart from the above specified compounds, any commercially available polyol curing agents for fluoroelastomers may be used.

When the medium is an organic solvent, those soluble or dispersible in the organic solvent are preferably used. When the medium is water, those soluble or dispersible in water are preferably used.

Amino Group-containing Metal Compounds

The amino group-containing metal compound to be used in the present invention means a compound which acts on an interface between the fluoroelastomer as an organic material and an inorganic material to form a strong bridge between them through a chemical or physical bond, which in particular functions as a curing agent of a fluoroelastomer, and further which can be safely used with a liquid medium.

In the present invention, an amino group-containing metal compound of at least one metal selected from the group consisting of Si, Al, Ti and Zr is preferably used.

Preferable examples of the amino group-containing metal compound include amino group-containing silane compounds and their monomers and oligomers; amino group-containing aluminum compounds and their monomers and oligomers; amino group-containing titanium compounds and their monomers and oligomers; amino group-containing zirconium compounds and their monomers and oligomers; and the like.

Preferred examples of the amino group-containing silane compounds include monomers or oligomers of N,N'-bis[3-(trimethoxylsilyl)propyl]-ethylenediamine, γ-aminopropyltriethoxysilane, N-β-aminoethyl-γ-aminopropyltrimethoxysilane, N-(trimethoxysilylpropyl)ethylenediamine, N-β-aminoethyl-γ-aminopropylmethyldimethoxysilane, γ-ureidopropyltriethoxysilane, β-aminoethyl-β-aminoethyl-γ-aminopropyltrimethoxysilane, 1,3-bis(3-aminopropyl)tetramethyldisiloxane, etc.

The amounts of the polyol curing agent and the amino group-containing compound are preferably 0.1 to 20 parts by weight of the polyol curing agent and 0.5 to 30 parts by weight of the amino group-containing compound, each based on 100 parts by weight of the fluoroelastomer, and a ratio of the curing agent to the amino group-containing compound is preferably from 1:1.2 to 1:30 (by weight). When the amount of the polyol curing agent is too small, for example, the resistance to long-life coolants (LLC resistance) may deteriorate. When the amount of the amino group-containing compound is too small, the adhesion of the coating film to a substrate may deteriorate. The total amount of the polyol curing agent and the amino group-containing compound is preferably at least 5 parts by weight.

Preferably, 0.5 to 5 parts by weight of the polyol curing agent and 6 to 15 parts by weight of the amino group-containing compound are used based on 100 parts by weight of the fluoroelastomer.

Curing Aids

To accelerate the curing of the composition, a curing agent may be used.

As a curing agent, the following compounds may be used:
quaternary alkyl- and aralkyl-ammonium salts such as trimethylbenzylammonium chloride, triethylbenzylammonium chloride, dimethyldecylbenzylammonium chloride, triethylbenzylammonium chloride, myristylbenzyldimethylammonium chloride, dodecyltrimethylammonium chloride, dimethyltetradecylbenzylammonium chloride, trimethyltetradecylammonium chloride, coconuttrimethylammonium chloride, stearyltrimethylammonium chloride, distearyldimethylammonium chloride, tetrabutylammonium hydroxide, 1,4-phenylenedimethylenebistrimethylammonium dichloride, 1,4-phenylenedimethylenebistriethylammonium dichloride, ethylenebistriethylammonium dibromide, etc.;

quaternary 1,8-diaza-bicyclo[5.4.0]-7-undecenium salts such as 8-methyl-1,8-diaza-bicyclo[5.4.0]-7-undecenium chloride, 8-methyl-1,8-diaza-bicyclo[5.4.0]-7-undecenium iodide, 8-methyl-1,8-diaza-bicyclo[5.4.0]-7-undecenium hydroxide, 8-methyl-1,8-diaza-bicyclo[5.4.0]-7-undecenium methylsulfate, 8-methyl-1,8-diaza-bicyclo[5.4.0]-7-undecenium bromide, 8-propyl-1,8-diaza-bicyclo[5.4.0]-7-undecenium bromide, 8-dodecyl-1,8-diaza-bicyclo[5.4.0]-7-undecenium chloride, 8-dodecyl-1,8-diaza-bicyclo[5.4.0]-7-undecenium hydroxide, 8-eicosyl-1,8-diaza-bicyclo[5.4.0]-7-undecenium chloride, 8-tetracosyl-1,8-diaza-bicyclo[5.4.0]-7-undecenium chloride, 8-benzyl-1,8-diaza-bicyclo[5.4.0]-7-undecenium chloride, 8-benzyl-1,8-diaza-bicyclo[5.4.0]-7-undecenium hydroxide, 8-phenethyl-1,8-diaza-bicyclo[5.4.0]-7-undecenium chloride, 8-(3-phenylpropyl)-1,8-diaza-bicyclo[5.4.0]-7-undecenium chloride, etc.;

tertiary amines such as trimethylamine, triethylamine, tri-n-propylamine, tri-n-butylamine, triisobutylamine, methyldiethylamine, dimethylethylamine, dimethyl-n-propylamine, dimethyl-n-butylamine, dimethylisobutylamine, dimethylisopropylamine, dimethyl-sec.-butylamine, dimethyl-tert.-butylamine, triallylamine, diallylmethylamine, allyldimethylamine, benzyldimethylamine, benzyldiethylamine, N-allylpiperidine, N-ethylpiperidine, N-butylpiperizine, N-methylpyrrolidine, N-cyclohexylpyrrolidine, N-n-butylpyrrolidine, N-ethylpyrrolidine, N-benzylpyrrolidine, 2,4,6-trimethylpyridine, etc.; and quaternary phosphonium salts such as benzyltriphenylphosphonium, methyltriphenylphosphonium, 2,4-dichlorobenzyltriphenylphosphonium, 4-methylbenzyltriphenylphosphonium, 4-chlorobenzyltriphenylphosphonium, m-trifluoromethylbenzyltriphenylphosphonium, 2-cyanobenzyltriphenylphosphonium, β-carbethoxybenzyltriphenylphosphonium, diphenylmethyltriphenylphosphonium, 1-naphthylmethyltriphenylphosphonium, carbethoxymethyltriphenylphosphonium, methoxymethyltriphenylphosphonium, allyloxymethyltriphenylphosphonium, 1-carbethoxyethyltriphenylphosphonium, isobutyltriphenylphosphonium, 4-cyanobutyltriphenylphosphonium, 2-pentyltriphenylphosphonium, allyltriphenylphosphonium, tetraphenylphosphonium, methyltrioctylphosphonium, benzyltrioctylphbsphonium, methoxyethoxyethyltrioctylphosphonium, butyltrioctylphosphonium, m-trifluoromethylbenzyltrioctylphosphonium, 2,2,3,3-tetrafluoropropyltrioctylphosphonium, 2,2,3,3,4,4,5,5-octafluoropentyltrioctylphosphonium, tetraoctylphosphonium, tetrabutylphosphonium, etc.

The addition of the curing aid can improve the physical properties of the coating film, although the physical properties may be attained to some extent in the absence of the curing aid.

The amount of the curing aid is from 0 to 10 parts by weight, preferably from 0.1 to 10 parts by weight, more preferably from 0.3 to 5 parts by weight, based on 100 parts by weight of the fluoroelastomer.

Adhesion Aids

An adhesion aid may be added to the coating composition of the present invention to adhere the composition to the substrate more strongly or to improve the affinity of the composition to the substrate.

For example, when the substrate is a metal or glass, a silane compound, a zirconium compound, a titanium compound or an aluminum compound may be used as the adhesion aid.

When the adhesion aid is used, its amount is from 0.5 to 30 parts by weight based on 100 parts by weight of the fluoroelastomer.

Stabilizers

A stabilizer may be added to the fluoroelastomer coating composition of the present invention to improve the storage stability thereof. As the stabilizer, an organic acid having 1 to 12 carbon atoms, preferably 1 to 4 carbon atoms are used. Preferable examples of the organic acids include monocarboxylic acids such as formic acid, acetic acid, propinic acid, etc. and dicarboxylic acids such as oxalic acid, malonic acid, succinic acid, etc.

Polyamine Curing Agents

To improve the mechanical properties, a polyamine curing agent may be added to the composition of the present invention in addition to the polyol curing agent.

Examples of the polyamine curing agent include aliphatic polyamines and their salts such as triethylenetetramine, tetraethylenepentamine, ethylenediamine, triethylenediamine, ethanolamine, 3,9-bis(3-aminopropyl)-2,4,8,10-tetraoxa-2-spiro[5.5]-undecane, etc.; aromatic amines and their salts such as diaminodiphenylmethane, xylylenediamine, phenylenediamine, diaminodiphenylsulfone, diaminodiphenyl ether, etc.; modified polyamines; polyamidoamines; and the like.

Liquid Media

Herein, the liquid medium means a liquid material in which the components of the composition of the present invention other than the liquid medium can be dissolved or dispersed.

Examples of the organic solvent include ketones (e.g. methyl ethyl ketone, methyl isobutyl ketone, etc.), esters (e.g. butyl actate, isopentyl acetate, etc.), ethers (e.g. diethylene glycol dimethyl ether, etc.), hydrocarbons (e.g. toluene, xylene, etc.), amides (e.g. N,N-dimethylacetamide, N-methyl-2-pyrrolidone, etc.), and the like. The amount of the organic solvent is from 40 to 90 wt. % of the weight of the whole coating composition.

When water is used as a liquid medium, a dispersant may be used to disperse the fluoroelastomer and a fluororesin in water.

Example of the dispersant include anionic surfactants (e.g. laurylsulfate salts, perfluoroalkylcarboxylate salts, ω-hydroperfluoroalkylcarboxylate salts, etc.), nonionic surfactants (e.g. polyethylene glycol derivatives, polyethylene glycol/polypropylene glycol derivatives, etc.) and resinous dispersants (e.g. alkylpolyethylene glycol ethers, alkylphenylpolyethylene glycol ether, alkylpolyethylene glycol esters, ethylene glycol/propylene glycol copolymers, polyethylene glycol alkyl esters, polycarboxylate salts, etc.).

Water is used in an amount of 30 to 90% by weight, and the dispersant is used in an amount of 0.1 to 10% by weight, each based on the weight of the whole composition.

In addition to the above-described components, the fluoroelastomer coating composition of the present invention may contain various additives which are usually added to the fluoroelastomer compositions, for example, fillers, colorants, acid-acceptors, etc.

Examples of the filler include carbon black, molybdenum disulfide, white carbon, calcium carbonate, barium sulfate, talc, calcium silicate, etc., and examples of the colorant include inorganic pigments, mixed oxide pigments, etc.

Examples of the acid-acceptor include magnesium oxide, lead oxide, zinc oxide, lead carbonate, zinc carbonate, and complex salts such as hydrotalcite. In general, the acid-acceptor is used in an amount of 1 to 40 parts by weight based on 100 parts by weight of the fluoroelastomer depending on the activity of the acid-acceptor.

The fluoroelastomer coating composition of the present invention may be prepared by the same preparation method as those used to prepare conventional fluoroelastomer coating compositions.

Specifically, the following methods can be employed.

When the Medium is an Organic Solvent:

The base polymer of the fluoroelastomer, which is obtained by emulsion polymerization, is coagulated and dried to obtain a green rubber. With this green rubber, the filler, the acid-acceptor, the colorant and the like are kneaded with an open roll or a kneader to prepare a compound. The compound is dissolved or dispersed in the organic solvent, and then the stabilizer may optionally be added to the compound to obtain Liquid A.

Separately, the polyol curing agent and the optional curing aid are dissolved or dispersed in the organic solvent to obtain Liquid B.

In the case of a two-pack type coating, Liquids A and B are mixed to obtain the coating composition.

Furthermore, the amino group-containing metal compound and optionally the adhesion aid and/or the polyamine curing agent are dissolved or dispersed in the organic solvent to prepare Liquid C.

When the Medium is Water:

A concentrated liquid of the fluoroelastomer is prepared by dispersing the fluoroelastomer in water in the presence of the dispersant. A fluoroelastomer latex as such may be used. The optional components such as the filler, the acid-acceptor and the dispersant are also dispersed with a mill in water using the dispersant. These dispersions are mixed, the stabilizer may optionally be added to the mixture and then the concentration and viscosity of the mixture are adjusted in suitable ranges with water to obtain Liquid A.

Separately, the aqueous solution of the polyol curing agent is prepared when it is soluble in water, or the aqueous dispersion of the curing agent is prepared using the dispersant when it is insoluble in water, and the curing aid may optionally be added to the aqueous solution or dispersion to obtain Liquid B.

In the case of a two-pack type coating, Liquids A and B are mixed to obtain the coating composition.

Furthermore, as Liquid C, the aqueous solution containing the amino group-containing metal compound and optionally the adhesion aid and/or the polyamine curing agent is used when they are soluble in water, or the aqueous dispersion containing the amino group-containing metal compound and optionally the adhesion aid and/or the polyamine curing agent as well as the dispersant is used when they are insoluble in water.

Fluororesins:

To the coating composition of the present invention, a melt-processable fluororesin may be added. The melt-processable fluororesin is a fluororesin having a melting point of 320° C. or less. Specific examples of the melt-processable fluororesin include the following fluororesins:

tetrafluoroethylene-hexafluoropropylene copolymers (FEP), tetrafluoroethylene-perfluoroalkyl vinyl ether (PFVE) copolymers (PFA), tetraflubroethylene-hexafluoropropylene-perfluoroalkyl vinyl ether copolymers (EPA), tetrafluoroethylene-chlorotrifluoroethylene copolymers (PCTFE), ethylene-tetrafluoroethylene copolymers (ETFE), polyvinylidene fluoride (PVdF), and polytetrafluoroethylene having a molecular weight of 300,000 or less (LMW-PTFE).

Here, examples of PVFE include compounds of the following formulas (1) to (5):

$$CF_2=CFO(CF_2)_nCF_2 \ (n=1 \text{ to } 9) \quad (1)$$

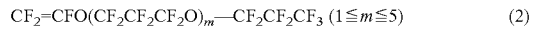
$$CF_2=CFO(CF_2CF_2CF_2O)_m-CF_2CF_2CF_3 \ (1 \leq m \leq 5) \quad (2)$$

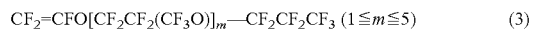
$$CF_2=CFO[CF_2CF_2(CF_3O)]_m-CF_2CF_2CF_3 \ (1 \leq m \leq 5) \quad (3)$$

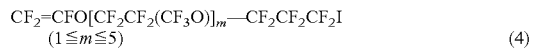
$$CF_2=CFO[CF_2CF_2(CF_3O)]_m-CF_2CF_2CF_2I \\ (1 \leq m \leq 5) \quad (4)$$

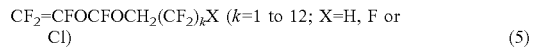
$$CF_2=CFOCFOCH_2(CF_2)_kX \ (k=1 \text{ to } 12; X=H, F \text{ or } Cl) \quad (5)$$

Among these fluororesins, FEP, PFA are EPA are preferable from the viewpoint of non-tackiness and surface smoothness of the coating film.

The dispersion of the fluororesin, which is obtained by emulsion polymerization, is formulated in the form of an aqueous dispersion using a medium such as water, etc. and a dispersant, or phase transferred to an organic solvent to obtain an organosol, and then the aqueous coating or the organosol is added to Liquid A.

When the fluororesin is compounded in the fluoroelastomer composition, the weight ratio of the fluoroelastomer to the fluororesin is usually from 95:5 to 20:80, preferably from 90:10 to 30:70.

When the amount of the fluoroelastomer exceeds the above upper limit, the effects of the addition of the fluororesin such as non-tackiness, abrasion resistance, etc. may not be attained. When the amount of the fluoroelastomer is less than the above lower limit, the coating film loses the elasticity of the fluoroelastomer and also the coating film may suffer from some defects such as cracking.

The coating composition of the present invention can be applied to an article to be coated by a conventional application method such as brush coating, spray coating, dip coating, flow coating, dispenser coating, screen coating, etc., and sufficiently dried, followed by baking to form a coating film.

Examples of articles or substrates to be coated with the coating composition of the present invention are as follows:

metals (e.g. iron, stainless steel, copper, aluminum, brass, etc.), glass products (e.g. glass plates, woven and non-woven fabric of glass fiber, etc.), molded articles or coated articles of general resins or heat-resistant resins (e.g. polypropylene, polyoxymethylene, polyimide, polyamide-imide, polysulfone, polyethersulfone, polyether ether ketone, etc.), molded articles or coated articles of general rubbers (e.g. styrene-butadiene rubber (SBR), isobutylene-isoprene rubber, nitrile-butadiene rubber (NBR), ethylene-propylene-diene monomer rubber (EPDM), etc.) and heat-resistant rubbers (e.g. silicone rubber, fluoroelastomer, etc.), woven and non-woven fabric of natural and synthetic fibers, and the like. In particular, the coating composition of the present invention has good adhesion properties to the metals.

One example of the method for forming the coating film according to the present invention (application of the coating composition) will be explained.

Preferably, the surface of the article to be coated is sufficiently degreased and washed prior to the application of the composition.

The fluoroelastomer coating composition is applied to the article by spray coating, flow coating, dispenser coating, screen coating, and so on and sufficiently dried around 100° C. to evaporate the solvent off.

Then, the article with the applied composition is baked at a temperature of 150 to 250° C. for 0.5 to 24 hours. Thereby, the fluoroelastomer in the composition is well cured and reaction gases and steam are expelled to outside the system.

The coating film formed from the composition of the present invention is suitably used to coat a metal gasket, since it has good resistance to antifreezes and improved surface degradation after long-term compression at a high temperature. When the coating film is formed on the surface of other substrates described above, it can be used in various fields which require heat resistance, solvent resistance, lubrication and/or non-stick properties. Specific examples of the applications include sheets and belts; O-rings, diaphragms, chemical-resistant tubes, fuel hoses, valve seals, gaskets for chemical plants, engine gaskets; rolls (e.g. fixing rolls, press rolls, etc.) and conveying belts for office automation equipment such as copying machines, printers, facsimiles, etc.; and the like.

EXAMPLES

The present invention will be illustrated by the following examples.

Example 1

Preparation of Primary Agent:

Firstly, MT carbon black (20 parts by weight) and an acid-acceptor (Hydrotalcite DHT-4A manufactured by KYOWA CHEMICAL INDUSTRIES, Ltd.) (5 parts by weight) were kneaded with a fluoroelastomer (DAIEL G-801 manufactured by Daikin Industries Ltd.) (100 parts by weight) with an open roll to obtain a compound. The compound was dissolved in a mixed solvent of butyl acetate (400 parts by weight) and methyl isobutyl ketone (400 parts by weight).

Separately, bisphenol AF (2 parts by weight) as a polyol curing agent and DBU-b (8-benzyl-1,8-diaza-bicyclo[5.4.0]-7-undecenium chloride) (0.5 part by weight) as a curing accelerator were dissolved in ethanol (17.5 parts by weight), and to this solution, acetic acid (2 parts by weight) and xylene (4 parts by weight) were added. The resulting solution was mixed with the above prepared solution of the compound with a disperser to obtain a primary agent.

Preparation of Curing Agent:

An amino group-containing metal compound, $H_2NCH_2CH_2CH_2Si(OCH_2CH_3)_3$ (manufactured by CHISSO) (15 parts by weight) was dissolved in butanol (85 parts by weight) to obtain a curing agent.

Preparation of Coating Composition:

The primary agent and the curing agent were mixed with a disperser to obtain a coating composition.

Formation of Coating Film:

The above coating composition (25 g) was poured in a fluororesin-coated card-size tray, spread over the bottom of the tray and then kept standing at room temperature for 3 days. Thereafter, the film in the tray was dried at 100° C. for 24 hours and then baked at 200° C. for 60 minutes. The baked film was removed from the tray, and its thickness was measured. The film thickness was about 300 μm.

Preparation of Coated Plate

On a SUS 301 plate, which had been cleaned with acetone, the coating composition was applied with an applicator of 16 mils. After being air dried, the film was dried at 80 to 100° C. for 30 minutes and then baked at 200° C. for 30 minutes.

Comparative Example 1

Preparation of Coating Composition:

The same procedures as those in Example 1 were repeated except that no curing agent was used.

Formation of Coating Film:

The above coating composition (25 g) was poured in a fluororesin-coated card-size tray, spread over the bottom of the tray and then kept standing at room temperature for 3 days. Thereafter, the film in the tray was dried at 100° C. for 24 hours and then baked at 200° C. for 60 minutes. The baked film was removed from the tray, and its thickness was measured. The film thickness was about 300 μm.

Preparation of Coated Plate

A SUS 301 plate, which had been cleaned with acetone, was dipped in a commercially available primer for fluoroelastomers and predried at 80 to 100° C. for 30 minutes. After being cooled to room temperature, the coating composition was applied on the plate with an applicator of 16 mils. After being air dried, the film was dried at 80 to 100° C. for 30 minutes and then baked at 200° C. for 30 minutes.

Comparative Example 2

MT carbon black (20 parts by weight) and an acid acceptor (Hydrotalcite DHT-4A manufactured by KYOWA CHEMICAL INDUSTRIES, Ltd.) (5 parts by weight) were kneaded with a fluoroelastomer (DAIEL G-801 manufactured by Daikin Industries Ltd.) (100 parts by weight) with an open roll to obtain a compound. This compound was dissolved in a mixed solvent of butyl acetate (400 parts by weight) and methyl isobutyl ketone (400 parts by weight).

Preparation of Curing Agent:

An amino group-containing metal compound, $H_2NCH_2CH_2CH_2Si(OCH_2CH_3)_3$ (manufactured by CHISSO) (15 parts by weight) was dissolved in butanol (85 parts by weight) to obtain a curing agent.

Preparation of Coating Composition:

The fluoroelastomer solution and the curing agent were mixed with a disperser to obtain a coating composition.

Formation of Coating Film:

The above coating composition (25 g) was poured in a fluororesin-coated card-size tray, spread over the bottom of the tray and then kept standing at room temperature for 3 days. Thereafter, the film in the tray was dried at 100° C. for 24 hours and then baked at 200° C. for 60 minutes. The baked film was removed from the tray, and its thickness was measured. The film thickness was about 300 μm.

Preparation of Coated Plate

On a SUS 301 plate, which had been cleaned with acetone, the coating composition was applied with an applicator of 16 mils. After being air dried, the film was dried at 80 to 100° C. for 30 minutes and then baked at 200° C. for 30 minutes.

With the coated plate produced in the Example and Comparative Examples, their antifreeze resistance and the degradation of the coated films were evaluated as follows:

<Antifreeze Resistance>

A TOYOTA genuine long-life coolant (LLC) was dissolved in water to prepare a 50% (v/v) aqueous solution. Then, the coated plate was dipped in this solution at 120° C. for 500 hours.

After dipping, the presence of blisters and the like on the surface of the coated film was visually checked, and ranked according to the following criteria:

When no change was observed in the appearance of the coated film, the plate was ranked "A", when the blisters partly formed, the plate was ranked "B", and when the blisters formed all over the coated film, the plate was ranked "C".

<Deterioration of Coated Film>

The coated plate was clamped with jigs for measuring a compression set without using spacers, and held at 200° C. for 5 hours. Thereafter, the presence of chips at the edges of the coated film was visually observed. When neither the squeezing out of the film nor chips were found, the coated plate was ranked "A", and when the coated film was squeezed out and the chips were found, the coated plate was ranked "C".

The results are shown in Table 1.

<Sealability (Compression Set According to JIS K 6262-5)>

The coating films were laminated to a total thickness of about 10 mm and the total thickness was measured with a dial gauge. Then, the laminated films were compressed by 25% and placed in a furnace at 175° C. for 72 hours. Then, the laminated films were removed from the furnace and cooled at room temperature for 30 minutes. Thereafter, the thickness of the laminated films was measured with a dial gauge. A compression set was calculated according to the following equation:

Compression set (%)=100×($t_0$-$t_1$)/($t_0$-$t_2$)

where
  $t_0$: thickness before compression (mm)
  $t_1$: thickness after compression (mm)
  $t_2$: thickness of a spacer (mm)

When the compression set was 50% or less, the coating film was ranked "A", when the compression set was 51% to 89%, the coating film was ranked "B", and when the compression set was 90% or larger, the coated film was ranked "C".

TABLE 1

| | Curing system | Primer | Antifreeze resistance | Deterioration of coated film | Sealability (compression set) |
|---|---|---|---|---|---|
| Ex. 1 | Polyol/polyamine | No | A | A | A |
| C. Ex. 1 | Polyol | Yes | B | C | B |
| C. Ex. 2 | Polyamine | No | A | C | C |

The invention claimed is:

1. A gasket of an automobile engine comprising:
   a metal plate, and
   a coated film formed on at least one surface of the metal plate from a fluoroelastomer coating composition which comprises a liquid medium, a fluoroelastomer, a polyol curing agent, an amino group-containing metal compound, a curing aid and an organic acid having 1 to 12 carbon atoms as a stabilizer which are dissolved or dispersed in the liquid medium, wherein the amino group-containing metal compound is present in an amount of 6 to 30 parts by weight and the curing aid is present in an amount of 0.1 to 10 parts by weight per 100 parts by weight of the fluoroelastomer,
   wherein the curing aid is selected from the group consisting of quaternary alkyl-aralkyl-ammonium salts, quaternary 1-8 diaza-bicyclo[5.4.0]-7-undecenium salts, tertiary amines and quaternary phosphonium salts.

2. The gasket according to claim 1, wherein the amino group-containing metal compound is present in an amount of 6 to 15 parts by weight.

3. The gasket according to claim 1, wherein the metal in the amino group-containing metal compound is at least one metal selected from the group consisting of Si, Al, Ti and Zr.

4. The gasket according to claim 1, wherein the fluoroelastomer coating composition further comprises a fluororesin.

5. The gasket according to claim 4, wherein the fluororesin is at least one fluororesin selected from the group consisting of tetrafluoroethylene-hexafluoropropylene copolymers, tetrafluoroethylene-perfluoroalkyl vinyl ether copolymers and tetrafluoroethylene-hexafluoropropylene-perfluoroalkyl vinyl ether copolymers.

6. The gasket according to claim 1, wherein said fluoroelastomer coating composition consists essentially of the liquid medium, the fluoroelastomer, the polyol curing agent, the amino group-containing metal compound, the curing aid and the organic acid having 1 to 12 carbon atoms as a stabilizer which are dissolved or dispersed in the liquid medium.

* * * * *